US011875131B2

(12) United States Patent
Li et al.

(10) Patent No.: US 11,875,131 B2
(45) Date of Patent: Jan. 16, 2024

(54) ZERO-SHOT CROSS-LINGUAL TRANSFER LEARNING

(71) Applicant: International Business Machines Corporation, Armonk, NY (US)

(72) Inventors: Zihui Li, New Haven, CT (US); Yunyao Li, San Jose, CA (US); Prithviraj Sen, San Jose, CA (US); Huaiyu Zhu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 17/022,153

(22) Filed: Sep. 16, 2020

(65) Prior Publication Data

US 2022/0083744 A1 Mar. 17, 2022

(51) Int. Cl.
  *G06F 40/47* (2020.01)
  *G06F 18/24* (2023.01)
  *G06N 3/045* (2023.01)

(52) U.S. Cl.
  CPC .............. *G06F 40/47* (2020.01); *G06F 18/24* (2023.01); *G06N 3/045* (2023.01)

(58) Field of Classification Search
  CPC ..... G06F 40/47; G06K 9/6267; G06N 3/0454
  See application file for complete search history.

(56) References Cited

U.S. PATENT DOCUMENTS

| 9,779,085 | B2 | 10/2017 | Wick |
| 9,842,585 | B2 | 12/2017 | Huang |
| 10,354,015 | B2 | 7/2019 | Kalchbrenner |
| 10,460,036 | B2 | 10/2019 | Duong |
| 2017/0024642 | A1* | 1/2017 | Xiong ...................... G06N 3/08 |
| 2019/0034407 | A1 | 1/2019 | Hagiwara |
| 2020/0034435 | A1 | 1/2020 | Norouzi |
| 2020/0034436 | A1 | 1/2020 | Chen |

(Continued)

FOREIGN PATENT DOCUMENTS

| CN | 110069790 A | 7/2019 |
| CN | 110134962 A | 8/2019 |

(Continued)

OTHER PUBLICATIONS

Agerri et al., "Language Independent Sequence Labelling for Opinion Target Extraction", Preprint submitted to Artificial Intelligence Journal, Nov. 28, 2018, 18 pages.

(Continued)

*Primary Examiner* — Douglas Godbold
*Assistant Examiner* — Edward Tracy, Jr.
(74) *Attorney, Agent, or Firm* — David K. Mattheis

(57) ABSTRACT

Providing a predictive model for a target language by determining an instance weight for a labeled source language textual unit according to a set of unlabeled target language textual units, scaling, by the one or more computer processors, an error between a predicted label for the source language textual unit and a ground-truth label for the source language textual unit according to the instance weight, updating, by the one or more computer processors, network parameters of a predictive neural network model for the target language according to the error, and providing, by the one or more computer processors, the predictive neural network model for the target language to a user.

6 Claims, 5 Drawing Sheets

(56) References Cited

U.S. PATENT DOCUMENTS

| | | | |
|---|---|---|---|
| 2020/0081982 A1* | 3/2020 | Tu | G06N 3/047 |
| 2020/0356870 A1* | 11/2020 | Ramasamy | G06N 20/00 |
| 2021/0042603 A1* | 2/2021 | Tu | G06N 3/04 |
| 2021/0141993 A1* | 5/2021 | Han | G06F 40/289 |
| 2022/0075958 A1* | 3/2022 | Zeng | G06F 16/35 |

FOREIGN PATENT DOCUMENTS

| | | |
|---|---|---|
| CN | 110321567 A | 10/2019 |
| CN | 110516245 A | 11/2019 |
| CN | 110717342 A | 1/2020 |
| CN | 111553168 A | 8/2020 |
| CN | 110364186 B | 6/2021 |

OTHER PUBLICATIONS

Chen et al., "Multi-Source Cross-Lingual Model Transfer: Learning What to Share", Proceedings of the 57th Annual Meeting of the Association for Computational Linguistics, Florence, Italy, Jul. 28-Aug. 2, 2019, pp. 3098-3112.

Dai et al., "Boosting for Transfer Learning", Appearing in Proceedings of the 24th International Conference on Machine Learning, Corvallis, OR, 2007, pp. 193-200.

Finn et al., "Model-Agnostic Meta-Learning for Fast Adaptation of Deep Networks", arXiv:1703.03400v3 [cs.LG] Jul. 18, 2017, Proceedings of the 34th International Conference on Machine Learning, Sydney, Australia, PMLR 70, 2017, 13 pages.

Jebbara et al., "Zero-Shot Cross-Lingual Opinion Target Extraction", Proceedings of NAACL-HLT 2019, Minneapolis, Minnesota, Jun. 2-Jun. 7, 2019, pp. 2486-2495.

Kim et al., "Cross-Lingual Transfer Learning for POS Tagging Without Cross-Lingual Resources", Proceedings of the 2017 Conference on Empirical Methods in Natural Language Processing, Copenhagen, Denmark, Sep. 7-11, 2017, pp. 2832-2838.

Kouw et al., "A review of domain adaptation without target labels", arXiv:1901.05335v2 [cs.LG] Jul. 24, 2019, 22 pages.

Kumar et al., "IIT-TUDA at SemEval-2016 Task 5: Beyond Sentiment Lexicon: Combining Domain Dependency and Distributional Semantics Features for Aspect Based Sentiment Analysis", Proceedings of SemEval-2016, San Diego, California, Jun. 16-17, 2016, pp. 1129-1135.

Li et al., "Deep Multi-Task Learning for Aspect Term Extraction with Memory Interaction", Proceedings of the 2017 Conference on Empirical Methods in Natural Language Processing, Copenhagen, Denmark, Sep. 7-11, 2017, pp. 2886-2892.

Liu et al., "Robust Classification Under Sample Selection Bias", Part of: Advances in Neural Information Processing Systems 27 (NIPS 2014), 11 pages.

Mell et al., "The NIST Definition of Cloud Computing", Recommendations of the National Institute of Standards and Technology, Special Publication 800-145, Sep. 2011, 7 pages.

Pontiki et al., "SemEval-2016 Task 5: Aspect Based Sentiment Analysis", Proceedings of SemEval-2016, San Diego, California, Jun. 16-17, 2016, pp. 19-30.

Wang et al., "Better Fine-Tuning via Instance Weighting for Text Classification", The Thirty-Third AAAI Conference on Artificial Intelligence (AAAI-19), pp. 7241-7248.

Xu et al., "Cross-lingual Distillation for Text Classification", Proceedings of the 55th Annual Meeting of the Association for Computational Linguistics, Vancouver, Canada, Jul. 30-Aug. 4, 2017, pp. 1415-1425.

Xu et al., "Cross-lingual Text Classification via Model Translation With Limited Dictionaries", CIKM'16 , Oct. 24-28, 2016, Indianapolis, IN, USA, pp. 95-104, DOI: http://dx.doi.org/10.1145/2983323.2983732.

Xu et al., "Towards a Universal Sentiment Classifier in Multiple languages", Proceedings of the 2017 Conference on Empirical Methods in Natural Language Processing, Copenhagen, Denmark, Sep. 7-11, 2017, pp. 511-520.

Zhou et al., "Attention-Based LSTM Network for Cross-Lingual Sentiment Classification", Proceedings of the 2016 Conference on Empirical Methods in Natural Language Processing, Austin, Texas, Nov. 1-5, 2016, pp. 247-256.

International Search Report and Written Opinion dated Dec. 24, 21 from PCT Application No. PCT/IB2021/058353 filed Sep. 14, 2021, 10 pps.

* cited by examiner

ZERO-SHOT CROSS-LINGUAL TRANSFER LEARNING

BACKGROUND

The disclosure relates generally to zero-shot cross-lingual transfer learning. The disclosure relates particularly to zero-shot cross-lingual transfer learning using instance weighting.

Most training methods for natural language processing (NLP) models utilize labeled data for multi-shot or few shot training processes. Most of the labeled data available for training natural language processor models is available in only a few languages, English being the most popular. Cross-lingual NLP methods attempt to transfer the learning of a model trained on a source language, to a target language.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable zero-shot cross-lingual transfer learning of natural language processing models.

Aspects of the invention disclose methods, systems and computer readable media associated with providing a predictive model for a target language by determining an instance weight for a labeled source language textual unit according to a set of unlabeled target language textual units, scaling an error between a predicted label for the source language textual unit and a ground-truth label for the source language textual unit according to the instance weight, updating network parameters of a predictive neural network model for the target language according to the error, and providing the predictive neural network model for the target language.

Aspects of the invention disclose methods, systems and computer readable media associated with providing a predictive model for a target language by inputting source language textual units and target language textual units into a language neural network, generating source language vectors from the source language textual units, generating target language vectors from the target language textual units, measuring a similarity between a source language vector and target language vectors, forming a scalar instance weight for each source language vector, generating a scaled error between a predicted label and a ground-truth label for the source language textual unit, computing updates for network parameters of a downstream predictive neural network model according to the scaled error, computing updates for the network parameters of the language neural network according to the scaled error, and providing a predictive neural network model including the downstream predictive neural network and the pretrained language neural network, for the target language.

Aspects of the invention disclose methods, systems and computer readable media associated with providing a predictive model for a target language by inputting, by one or more computer processors, labeled source language textual units and unlabeled target language textual units into a language neural network, determining using the language neural network, a scalar instance weight for a source language textual unit, scaling an error between a label for the source language textual unit predicted by a downstream neural network, and a ground truth label for the source language textual unit, computing updates for network parameters of the downstream neural network and network parameters of the language neural network, and providing a predictive model for the target language, the model comprising the language neural network and the downstream neural network.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
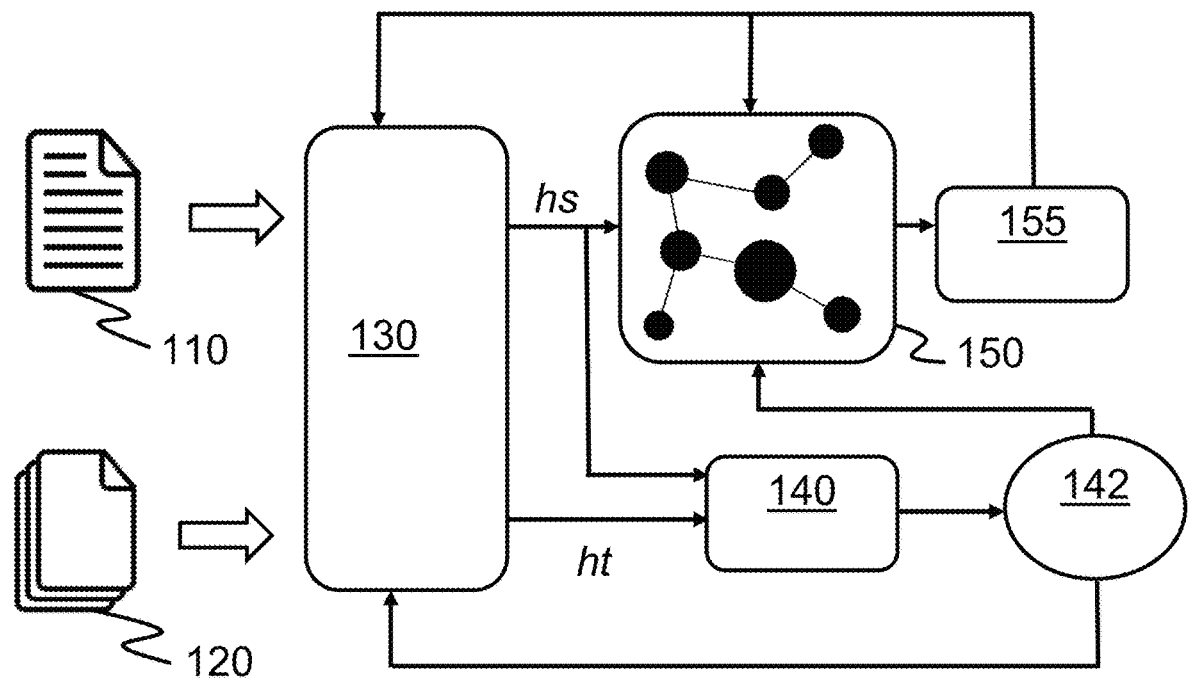
FIG. 1 provides a data flow diagram for training a model, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., vectorizing source and target language textual units, determining similarities between source and target vectors, calculating instance weights for source language instances, according to the vector similarities, scaling a model's loss function for an instance according to the calculated instance weight, upscaling the associated model gradients of neural networks during back-propagation to correct the model prediction for the instance, etc.). These solutions are not abstract and cannot be performed as a set of mental acts by a human due to the processing capabilities needed to facilitate zero-shot cross-lingual model training, for example. Further, some of the processes performed may be performed by a specialized computer for carrying out defined tasks related to training a predictive language model. For example, a specialized computer can be employed to carry out tasks related to zero-shot cross-lingual model training or the like.

Cross-lingual text-classification learning refers to using a natural language processing (NLP) text-classification model trained using labeled data of a source language, to perform text classification tasks upon data from a target language. As used herein, zero-shot learning refers to training a cross-lingual transfer model with labeled source language data and without the use of any labeled data for the target language. Zero-shot learning represents an alternative training path for the training of NLP models for the many languages which lack a substantial labeled data set for training an NLP model.

Disclosed systems and methods enable zero-shot transfer learning for developing NLP text classification and sequence labeling models for languages lacking labeled data sets through the use of instance weighting in training the models. Disclosed methods enable the development of models by transfer learning and the enhancement of existing NLP models through instance weighting based back-propagation.

As an example, an NLP model configured to classify English language book reviews as positive or negative may be modified using the disclosed systems and methods such that the model accurately classifies book reviews from other languages—the target languages—without the need for any labeled target language data.

In an embodiment, labeled textual units (sentences, paragraphs, documents) from a source language and unlabeled textual units from a target language are individually processed by a pre-trained language model to generate high dimensional vector representations of each textual unit (instance) of each language. In this embodiment, a pre-trained model such as a Bi-directional Encoder Representation from Transformers (BERT) model, or a Robustly optimized BERT approach (RoBERTa) vectorizes the input textual units, providing a vector output for each textual unit. In this embodiment, the source language instances ($X_{s1}$, $X_{s2}$, $X_{s3}$ ... $X_{sn}$) have associated instance labels ($Y_{s1}$, $Y_{s2}$, $Y_{s3}$, ... $Y_{sn}$) provided as ground-truth labels for each of the source language instances during model training. The target language instances ($X_{t1}$, $X_{t2}$, $X_{t3}$ ... $X_{tn}$) do not have associated labels. For either source or target language, each instance contains a sequence of tokens ($t_1$, $t_2$, $t_3$, ... $t_n$). In this embodiment, the method trains a model M using the labeled source language instances from a label-rich language, such as English, able to make predictions for target language instance inputs.

In an embodiment, for sentiment or text classification, the model includes a fully-connect neural network layer appended to the [CLS] token of the BERT or RoBERTa output. In BERT, the [CLS] token indicates the beginning of an input sequence. A [CLS] token is inserted at the beginning of each input textual unit token sequence. In an embodiment, for opinion extraction, the method treats the problem as one of sequence labeling and the structure includes a fully connected layer that is shared for the set of tokens. For either structure, the BERT model utilized includes 12 layers. Other, more complex machine learning structures may also be used for the analysis.

In an embodiment, the method calculates an instance weighting for each source language input textual unit instance. Input instance weights are determined such that source language instances having a higher degree of similarity to the target language have higher instance weights in the final model. In an embodiment, instance weights are determined by comparing the similarity of a source language textual unit instance to each target language instance. In an embodiment, the method determines the similarity of a source language textual unit instance to a limited batch of target language textual unit instances. As an example, the method determines the similarity of a single source language textual unit instance to each of a set of four target language textual unit instances. In an embodiment, the method randomly selects source language textual units and target language textual units from among the set of available source and target language textual units. The set of available source language textual units may include textual units from each of plurality of source languages. The method randomly selects a set of target language textual units to compare to the selected source language unit.

The method determines the similarity between a source language instance vector $h_{si}$ selected from a source language input data batch $D_s$, and each target language instance vector $h_{tj}$ of the corresponding batch of target language instances $D_t$. The determined vector similarities are used to determine an instance weight for each $h_{si}$. The determined instance weights influence the changes to network gradients through the gradient descent function applied to update the node weights of both the pre-trained language neural network and the fully connected neural networks.

In an embodiment, the method determines a similarity score $s_i$, for each instance $x_i$, of the set of source language input instances $X_s$. The set of source language instances may include instances from a single language or from multiple languages. The input instances in the set are labeled data. For each input data instance, the method determines a similarity score between the vector representation $h_{si}$, of the input instance and at least a batch subset of target language input instances $h_{tj}$. The method sums the similarity scores $s=\text{score}(i, j)$ between $h_{si}$, and each $h_{tj}$, of the batch of target language inputs. In this embodiment, the method normalizes the set of summed scores for all source language instances. The method applies the normalized value $w_i$, the instance weight for the current instance, in the gradient descent back-propagation calculations. These calculations update the node weights of both the pre-trained language neural network and the fully connected task neural network. The fully connected neural network predicts the output for the target language instances. The method utilizes a scoring function for each pair of vectors $h_{is}$, $h_{tj}$, such as a cosine similarity function, a Euclidean distance function, a vector correlation alignment function, or other vector similarity functions.

Table 1 provides examples of two English source language input instances, one positive and one negative, scored against a French target language instance—where the French instance is ultimately determined to be positive. The positive English instance received a higher score, 0.5056, than the negative English instance, 0.3647, so in this example, the instance weighting for the positive English instance would be set higher than the instance weighting of the negative English instance, such that the positive English instance has a greater impact on the training of the neural networks as a way of increasing the cross-lingual accuracy of the final model.

TABLE 1

| Language | Score | Content | Label |
|---|---|---|---|
| English Instance 1 | 0.5056 | ... I liked the book. This author has consistently been one of my favorite authors His theme is consistent: many nation states are not really nation states . . . I get the sense that when this book was written, The author had great hope for the future of Iran as they struggle with theocracy. Ecocide, or the killing of natural resources is a new topic for me that The author introduces. | Pos |

TABLE 1-continued

| Language | Score | Content | Label |
|---|---|---|---|
| English Instance 2 | 0.3647 | One start, for some very acurate dramatic and terrorific facts about the Ebola, but very weak regarding origin of the virus, very unconvincing about possible "theories". sound more like that old music of desinformation, he almost blame another monkey for the Ebola like they did before with other diseases . . . | Neg |
| French | | Origin: . . . ce livre est exceptionnel, mais aussi pervers, déroutant, dévoilant les atrocités humaines par le biais de ce personnage repoussant poussant à travers les pays. La construction du livre est superbe, l'écriture magique . . . Translation: . . . this book is outstanding, but also perverse, disturbing, revealing the human atrocities through this character pushing through countries. The construction of book is superb, magical writing . . . | Pos |

Table 2 provides examples of two English source language input instances, one positive and one negative. scored against a French target language instance—where the French instance is ultimately determined to be negative. The negative English instance received a higher score, 0.4828, than the positive English instance, 0.3436, so in this example, the instance weighting for the negative English instance would be set higher than the instance weighting of the positive English instance, such that the negative English instance has a greater impact on the training of the neural networks as a way of increasing the cross-lingual accuracy of the final model.

TABLE 2

| Language | Score | Content | Label |
|---|---|---|---|
| English Instance 2 | 0.4828 | I found the book to be very boring, as a matter of fact I didn't even try to finish the book. So save your money and buy something better. | Neg |
| English Instance 1 | 0.3436 | A wonderful story of devotion! This author continues to be one of my favorite children's story tellers. Criture is a sweet little creature who remains loyal in spite of others' misgivings. The use of so many animals strange to the Americas makes the book even more wonderful, with delightful pictures to help with the story. | Pos |
| French | | Origin: . . . La traduction est telle que le texte est quasi incompréhensible et la lecteur laborieuse. On se reportera à la traduction de l'édition Folio qui elle contient préface, notes, chronologie, variantes. Translation: . . . The translation is such that the text is almost incomprehensible and laborious drive. Please refer to the translation of the Folio edition which contains preface, notes, chronology variants. | Neg |

FIG. 1 provides an illustration of the flow of data in training the predictive model of the disclosed method, according to an embodiment of the present invention. As shown in the Figure, input textual units from each of the source language 110, and the target language 120, are passed to a pretrained language model 130, such as BERT, RoBERTa, or other known pre-trained language model. Pretrained language model 130 outputs vectorized representations hs of the source language input textual units, and ht of the target language textual units. At 140, the method receives vector representations hs and ht, and determines vector similarities between them. In an embodiment, the method determines the similarities using a cosine similarity function and sums the similarities between the vector representation hs of a source language input textual unit 110 and the vector representations ht for each of a batch of target language input textual units 120. The method normalizes the summed similarity scores. The method applies the normalized similarity score value for each source language instance as the instance weighting 142, for that instance to scale the network loss function value for the instance. The method utilizes the instance weighting during the gradient descent calculations used in backpropagation to train the networks and minimize the prediction loss-function value 155, for the instance. The prediction loss-function value 155, relates to the difference between the model's prediction for the source language input instance and the ground-truth value provided for the labeled source language input instances. The method uses the instance weights 142, in training both the pretrained language neural network 130, and the downstream predictive neural network 150. The gradients of each network are adjusted to minimize the loss function of the downstream predictive neural network which receives input from the language neural network. Network training through backpropagation and gradient descent iterates until there is no further improvement in the loss function value for the instance. After iterative gradient descent training including the instance weightings completes, the method provides the combination of the pretrained language neural network 130, and the downstream predictive neural network 150, as a predictive neural network model used for cross-lingual NLP tasks using the target language.

Figure 2:
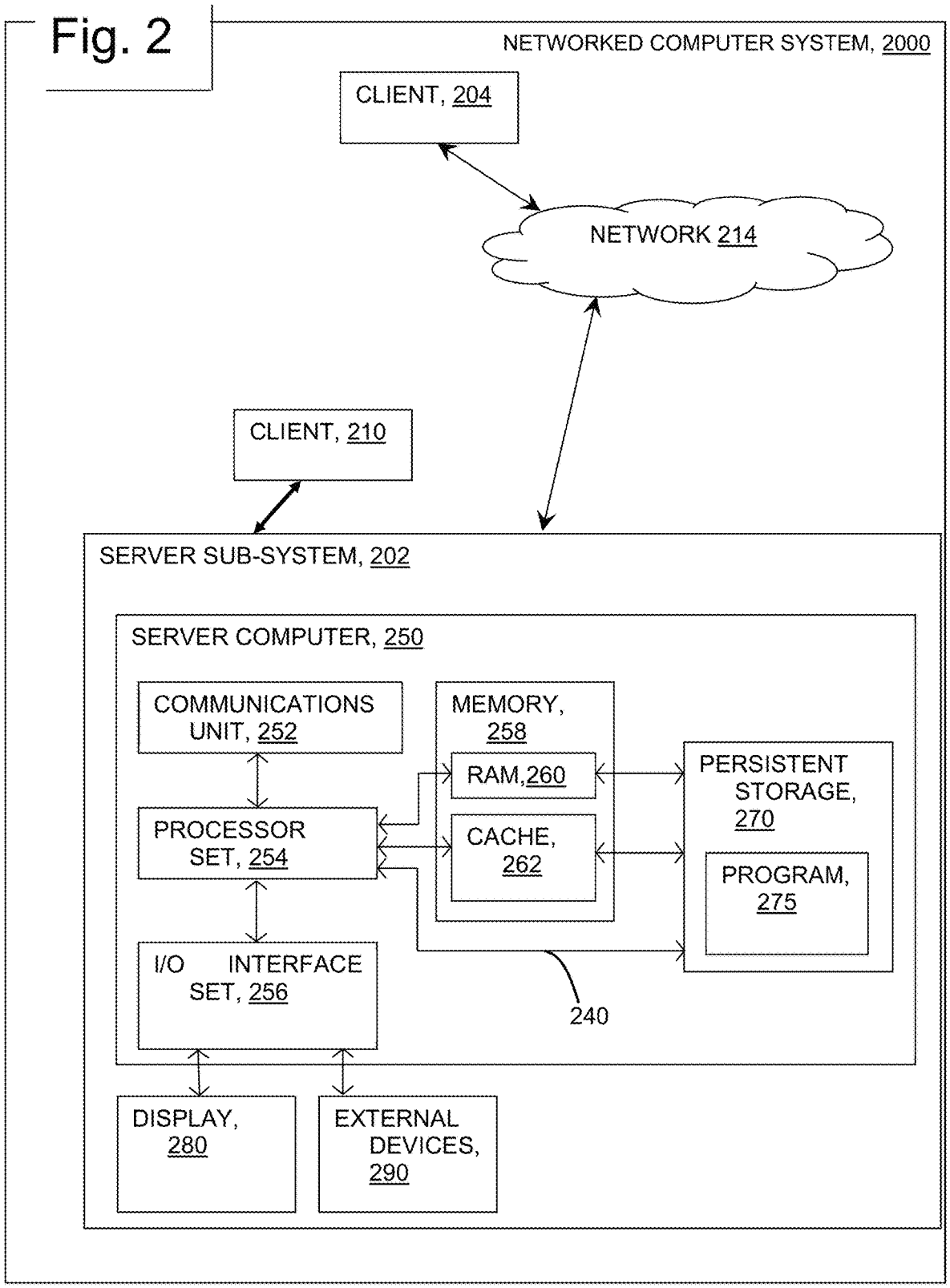
FIG. 2 provides a schematic illustration of a computing environment, according to an embodiment of the invention.

FIG. 2 provides a schematic illustration of exemplary network resources associated with practicing the disclosed inventions. The inventions may be practiced in the processors of any of the disclosed elements which process an instruction stream. As shown in the figure, a networked Client device 210 connects wirelessly to server sub-system 202. Client device 204 connects wirelessly to server subsystem 202 via network 214. Client devices 204 and 210 comprise cross-lingual model training program (not shown) together with sufficient computing resource (processor, memory, network communications hardware) to execute the program. As shown in FIG. 2, server sub-system 202 comprises a server computer 250. FIG. 2 depicts a block diagram of components of server computer 250 within a networked computer system 2000, in accordance with an embodiment of the present invention. It should be appreciated that FIG. 2 provides only an illustration of one implementation and does not imply any limitations with regard to the environments in which different embodiments can be implemented. Many modifications to the depicted environment can be made.

Server computer 250 can include processor(s) 254, memory 258, persistent storage 270, communications unit 252, input/output (I/O) interface(s) 256 and communications fabric 240. Communications fabric 240 provides communications between cache 262, memory 258, persistent storage 270, communications unit 252, and input/output (I/O) interface(s) 256. Communications fabric 240 can be implemented with any architecture designed for passing data and/or control information between processors (such as microprocessors, communications and network processors, etc.), system memory, peripheral devices, and any other hardware components within a system. For example, communications fabric 240 can be implemented with one or more buses.

Memory 258 and persistent storage 270 are computer readable storage media. In this embodiment, memory 258 includes random access memory (RAM) 260. In general, memory 258 can include any suitable volatile or non-volatile computer readable storage media. Cache 262 is a fast memory that enhances the performance of processor(s) 254 by holding recently accessed data, and data near recently accessed data, from memory 258.

Program instructions and data used to practice embodiments of the present invention, e.g., the cross-lingual model training program 275, are stored in persistent storage 270 for execution and/or access by one or more of the respective processor(s) 254 of server computer 250 via cache 262. In this embodiment, persistent storage 270 includes a magnetic hard disk drive. Alternatively, or in addition to a magnetic hard disk drive, persistent storage 270 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 270 may also be removable. For example, a removable hard drive may be used for persistent storage 270. Other examples include optical and magnetic disks, thumb drives, and smart cards that are inserted into a drive for transfer onto another computer readable storage medium that is also part of persistent storage 270.

Communications unit 252, in these examples, provides for communications with other data processing systems or devices, including resources of client computing devices 204, and 210. In these examples, communications unit 252 includes one or more network interface cards. Communications unit 252 may provide communications through the use of either or both physical and wireless communications links. Software distribution programs, and other programs and data used for implementation of the present invention, may be downloaded to persistent storage 270 of server computer 250 through communications unit 252.

I/O interface(s) 256 allows for input and output of data with other devices that may be connected to server computer 250. For example, I/O interface(s) 256 may provide a connection to external device(s) 290 such as a keyboard, a keypad, a touch screen, a microphone, a digital camera, and/or some other suitable input device. External device(s) 290 can also include portable computer readable storage media such as, for example, thumb drives, portable optical or magnetic disks, and memory cards. Software and data used to practice embodiments of the present invention, e.g., cross-lingual model program 275 on server computer 250, can be stored on such portable computer readable storage media and can be loaded onto persistent storage 270 via I/O interface(s) 256. I/O interface(s) 256 also connect to a display 280.

Display 280 provides a mechanism to display data to a user and may be, for example, a computer monitor. Display 280 can also function as a touch screen, such as a display of a tablet computer.

Figure 3:
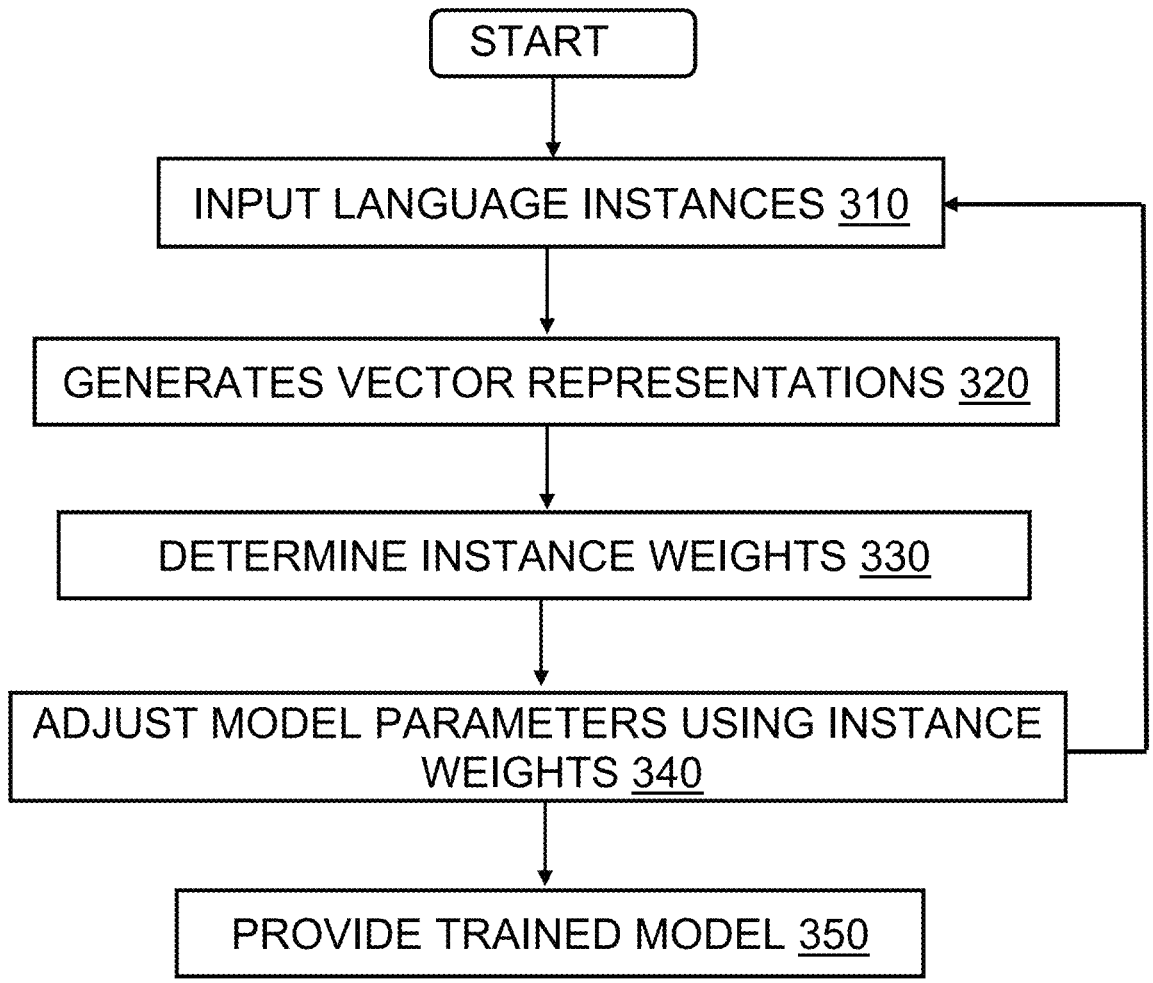
FIG. 3 provides a flowchart depicting an operational sequence, according to an embodiment of the invention.

FIG. 3 provides a flowchart 300, illustrating exemplary activities associated with the practice of the disclosure. After program start, at block 310, cross-lingual model training program 275, from FIG. 2, inputs respective sets of textual units from each of a source language and a target language to a pretrained language neural network. In an embodiment, textual units from multiple source languages are input to the pretrained language neural network along with the target language textual units. The source language textual units are labeled data, and the target language textual units are unlabeled data. In this embodiment, using source language textual units from multiple source languages yields a more accurate predictive model for the target language. the method randomly selects a single source language textual unit from one of a plurality of source languages and determines an instance weight for the randomly selected source language textual unit using a set of randomly selected unlabeled target language textual units as described above.

At block 320, the method generates vector representations of the input textual units, hs for the source language and ht for the target language. At block 330, the method passes the generated hs and ht, to an instance weighting calculator. The instance weights are calculated by first determining a similarity between each hs and a batch of ht. The set of similarities for the hs are summed and normalized. The method passes the final value of the hs along as the scalar instance weight to be used for that hs in the backpropagation gradient descent training of the pretrained language neural network as well as the downstream predictive neural network.

At block 340, the method evaluates the loss function for the downstream predictive neural network for an hs and scales the error, or adjusts the loss function value, using the instance weighting value for the instance hs. The method uses backpropagation gradient descent to iteratively adjust the node weights of each of the pretrained neural network and the downstream predictive neural network.

As an example, for a binary class: if a predicted label is 0 and a ground truth label is 0 then misclassification error (loss) is 0 (because the prediction is correct in this case); if the predicted label is 1 and the ground truth label is 1 then misclassification loss is 0 (because the prediction is correct in this case); if the predicted label is 0 and the ground truth label is 1 then misclassification loss is 1 (because the prediction is wrong in this case); and if the predicted label is 1 and the ground truth label is 0 then misclassification loss is 1 (because the prediction is wrong in this case).

Generating a scaled error, or scaling the loss function value, by the instance weight means multiplying the loss (whatever it turns out to be given the above rules) by the instance weight. As an example, for an instance weight of 0.5, a predicted label of 0 and ground truth label of 1, the scaled error would be 0.5. For each iteration, the training/learning algorithm focuses on achieving the correct prediction for the misclassified instance having the highest instance weight value.

Evaluating the loss function, the method iterates, returning to block 310 for further input instances. Iterations continue until improvements to the loss function value cease or become de-minimis, indicating that the model has been sufficiently trained. After training the pretrained and downstream predictive neural networks, at block 350, the method provides the combination of the pretrained neural network and the downstream predictive neural network to a user as a predictive model for use predicting text classifications of text sequences for the target language. The method achieves zero-shot training of the predictive model for the target language. Training the model completes without using any labeled target language textual units.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Steps of cross-lingual model training program 275, vectorizing input language instances across source and target languages, calculating instance weights for source language inputs, training pretrained neural networks and downstream predicative neural networks using backpropagation gradient descent modified by the calculated instance weights, etc., require access to extensive computing resources. Local computing environments may lack sufficient resources for the program, necessitating the use of edge cloud or cloud resources to efficiently execute the required programming steps.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
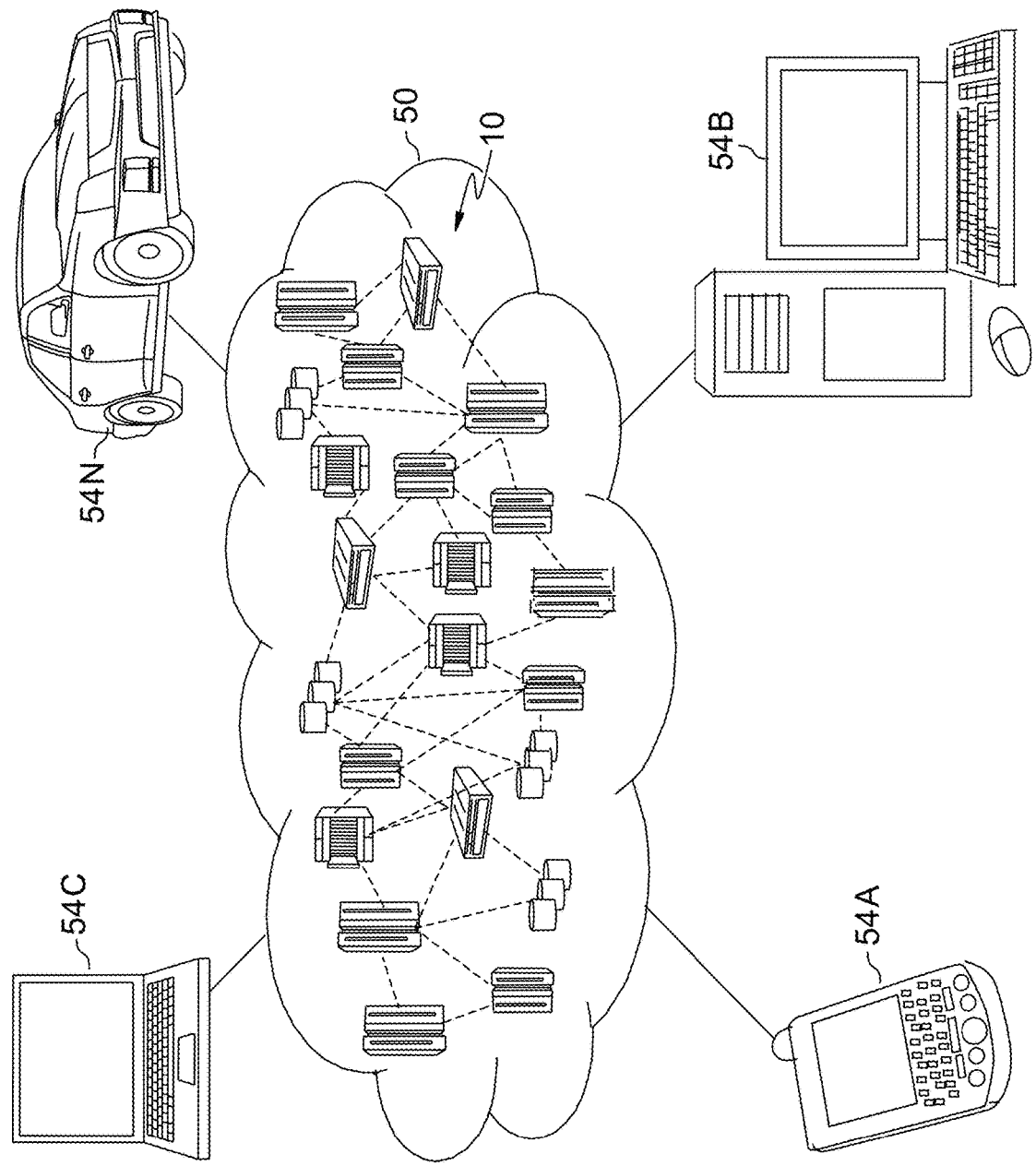
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
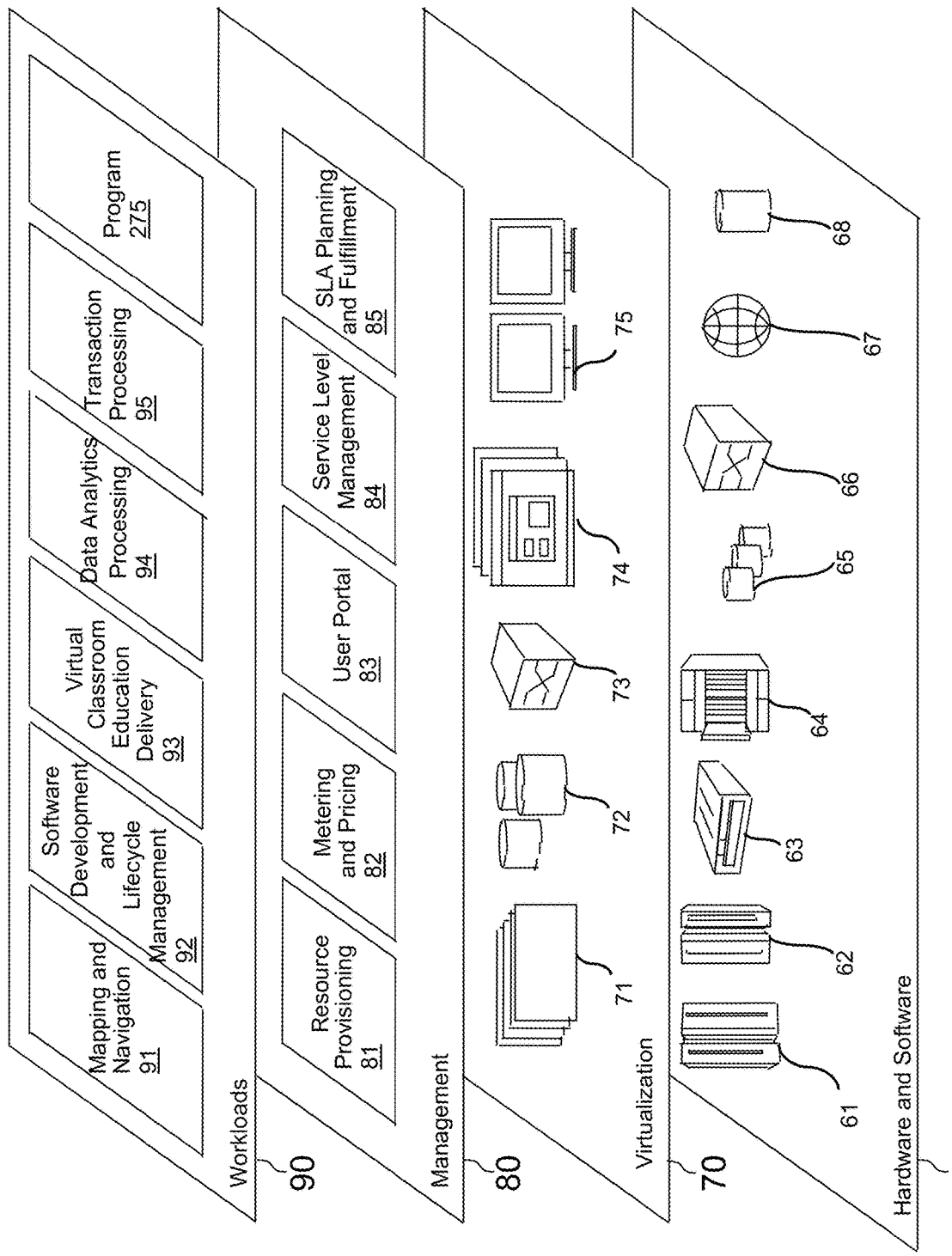
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cross-lingual model training program 275.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing a predictive model for a target language, the method comprising:

inputting, by one or more computer processors, source language textual units and target language textual units into a pretrained language neural network;

generating by the one or more computer processors, source language vectors from the source language textual units;

generating, by the one or more computer processors, target language vectors from the target language textual units;

measuring, by the one or more computer processors, a similarity between a source language vector of the source language vectors and a plural set of target language vectors of the target language vectors;

determining, by the one or more computer processors, a scalar instance weight for each source language vector according to the similarity;

generating, by the one or more computer processors, a scaled error between a predicted label for the source language textual unit and a ground-truth label for the source language textual unit, using the scalar instance weight for the source language vector;

computing, by the one or more computer processors, updates for network parameters of a downstream predictive neural network model according to the scaled error;

computing, by the one or more computer processors, updates for network parameters of the language neural network according to the scaled error, and providing, by the one or more computer processors, a predictive neural network model for the target language, the predictive neural network model including the downstream predictive neural network and the language neural network.

2. The method of claim 1, wherein measuring the similarity comprises summing the similarity between the source language vector and each target language vector of a set of target language vectors.

3. The method of claim 1, further comprising:
inputting textual units from multiple source languages.

4. The method according to claim 1, wherein the source language textual units comprise labeled data.

5. The method according to claim 1, wherein the target language textual units comprise unlabeled data.

6. The method of claim 1, further comprising using the predictive neural network model as a document classifying model for the target language.

* * * * *